United States Patent
Chisu et al.

(10) Patent No.: US 10,992,368 B1
(45) Date of Patent: Apr. 27, 2021

(54) THERMAL BASED WIRELESS CONFIGURATION

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/813,147

(22) Filed: Mar. 9, 2020

(51) Int. Cl.
*H04B 7/08* (2006.01)
*H04B 7/06* (2006.01)

(52) U.S. Cl.
CPC ......... *H04B 7/0814* (2013.01); *H04B 7/0608* (2013.01)

(58) Field of Classification Search
CPC .......................... H04B 7/0608; H04B 7/0814
See application file for complete search history.

(56) References Cited

U.S. PATENT DOCUMENTS

| | | | |
|---|---|---|---|
| 5,991,613 A * | 11/1999 | Euscher | H04B 7/0814 455/275 |
| 8,204,446 B2 | 6/2012 | Scheer et al. | |
| 2018/0020403 A1 * | 1/2018 | Komati | H04W 72/048 |
| 2019/0140722 A1 * | 5/2019 | Raghavan | H04W 72/046 |

* cited by examiner

*Primary Examiner* — Vineeta S Panwalkar
(74) *Attorney, Agent, or Firm* — FIG. 1 Patents

(57) ABSTRACT

Techniques for thermal based wireless configuration are described, and may be implemented via a wireless device to adapt antennas and/or wireless beams of the wireless device based on a thermal condition. Generally, the described techniques enable the wireless device to compensate for thermal conditions that occur at different antennas, such as high temperatures that may degrade antenna and device performance.

20 Claims, 7 Drawing Sheets

THERMAL BASED WIRELESS CONFIGURATION

BACKGROUND mon Wireless communication is ubiquitous and is used for a multitude of purposes, including wireless voice and data communication. Further, wireless protocols are constantly evolving to provide increased service levels for wireless users. For instance, recent developments in wireless technology have greatly increased the rate at which information can be transmitted wirelessly. One example of such a development is the 5G wireless cellular technology (e.g., 5G New Radio (NR)), which typically achieves higher data rates than previous wireless technologies. Such recently developed technologies achieve increased data rates at least in part by utilizing higher frequency wireless spectrum than previous technologies, such as 3.5 gigahertz (GHz) and higher. In fact, some implementations of these wireless technologies use extremely high frequency (EHF) frequencies, such as millimeter wave (mmWave) frequencies. While higher data rates can be achieved, such technologies exhibit a number of implementation challenges, such as increased directionality. Further, higher frequency wireless technologies can result in increased heat accumulation within a device, which can reduce device performance.

BRIEF DESCRIPTION OF THE DRAWINGS

Aspects of thermal based wireless configuration are described with reference to the following Figures. The same numbers may be used throughout to reference similar features and components that are shown in the Figures.

DETAILED DESCRIPTION

Figure 1:
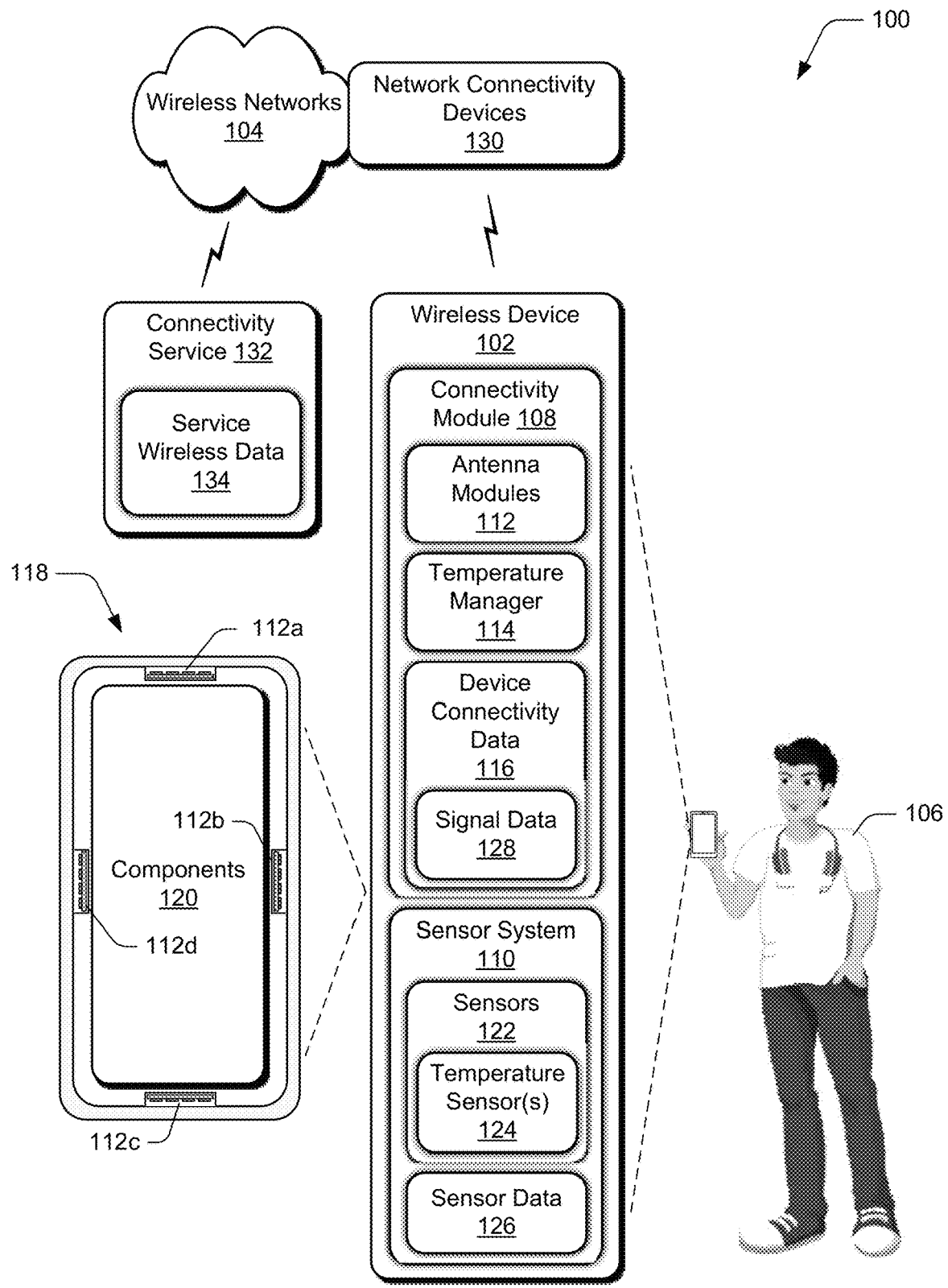
FIG. 1 illustrates an example environment in which aspects of thermal based wireless configuration can be implemented.

Techniques for thermal based wireless configuration are described, and may be implemented via a wireless device to adapt antennas and/or wireless beams of the wireless device based on a thermal condition. Generally, the described techniques enable the wireless device to compensate for thermal conditions that occur at different antennas, such as high temperatures that may degrade antenna and device performance.

Consider, for example, a scenario where a user interacts with a wireless device (e.g., a mobile phone) while wireless signal is exchanged between the wireless device and a source of wireless signal, such as a wireless cellular base station. As part of the wireless signal exchange, a particular antenna of the wireless device acts as a primary antenna that receives a wireless beam from the signal source, such as generated between the wireless device and the signal source via beamforming. At some point during the exchange of wireless signal, the antenna exhibits a thermal condition, such as based on a temperature of the antenna exceeding a specified temperature threshold. Generally, different factors can cause the thermal condition, such as high data rates experienced between the antenna and the wireless signal source, an external object obstructing the antenna (e.g., a user's grip), and so forth. For instance, heat accumulated at an antenna may result from a variety of different factors, such as operation of the antenna itself, heat generated by other components of an associated device (e.g., radio frequency (RF) circuitry, a power amplifier, a battery, etc.), heat from sources external to a device (e.g., heat generated by a user, other nearby devices, etc.), and so forth.

Accordingly, based on detecting the thermal condition, a connectivity module of the wireless device implements a process to compensate for the antenna's thermal condition. For instance, the connectivity module inspects other antennas of the wireless device to locate a different antenna that is capable of meeting a threshold signal condition (e.g., signal strength and/or signal quality) and that is within acceptable thermal conditions. Based on identifying the different antenna, the connectivity module designates the different antenna as a primary antenna for wireless communication. Further, the original antenna that experienced the thermal condition may be deactivated, or operated in a reduced capacity mode to enable the antenna to return to an acceptable thermal condition.

Additionally or alternatively to selecting different antennas for wireless communication based on a thermal condition, the described techniques may perform antenna aggregation where multiple antennas are combined to provide wireless connectivity. For instance, consider the scenario above where the thermal condition occurs for a particular antenna. While the particular antenna may be experiencing the thermal condition, the connectivity module may determine that wireless signal received at the antenna still exhibits acceptable signal condition, e.g., meets a threshold signal strength and/or signal quality. Accordingly, the connectivity module can aggregate the antenna with the different antenna such that both antennas are active and participate concurrently in wireless communication for the wireless device. In at least one implementation, a single wireless beam can be spread across the aggregated antennas to enable both antennas to participate in wireless communicate via the single beam. Alternatively or in addition, each antenna of the aggregated antennas can receive its own wireless beam, such as to enable multiple wireless beams to be used for concurrent wireless communication with a wireless signal source.

Generally, the various implementations discussed herein can be performed dynamically and in real-time to compensate for changes in temperature and/or signal condition that occur as part of wireless communication. For instance, in a scenario where a thermal condition occurs at a first antenna and thus a second antenna is selected to replace the first antenna, the second antenna may subsequently exhibit a thermal condition. Thus, the described techniques may be subsequently implemented to select a third antenna to replace and/or supplement the second antenna. Further, in antenna aggregation scenarios, antennas selected to be aggregated can be dynamically selected and can change in real-time to compensate for changes in antenna condition of individual antennas, e.g., thermal condition and/or signal condition. Thus, the described techniques enable adjustment of antenna configurations to occur dynamically in response to various events, thus enabling wireless performance of a wireless device to be optimized in real-time.

For instance, instead of relying on conventional reactive processes that simply reduce operating state of an antenna to compensate for high antenna temperature, the described techniques perform dynamic antenna and/or wireless beam selection to avoid deterioration in wireless performance that may be experienced in conventional processes.

While features and concepts of thermal based wireless configuration can be implemented in any number of different devices, systems, environments, and/or configurations, aspects of thermal based wireless configuration are described in the context of the following example devices, systems, and methods.

FIG. 1 illustrates an example environment 100 in which aspects of thermal based wireless configuration can be implemented. The example environment 100 includes a wireless computing device ("wireless device") 102 that is connectable to wireless networks 104. In this particular example, the wireless device 102 represents a portable device that can be carried by a user 106, such as a smartphone, a tablet device, a laptop, a wearable computing device, (e.g., a smartwatch or a fitness tracker), and so forth. These examples are not to be construed as limiting, however, and the wireless device 102 can be implemented in a variety of different ways and form factors. Further example attributes of the wireless device 102 are discussed below with reference to the device 700 of FIG. 7.

The wireless device 102 includes various functionality that enables the wireless device 102 to perform different aspects of thermal based wireless configuration discussed herein, including a connectivity module 108 and a sensor system 110. The connectivity module 108 represents functionality (e.g., hardware and logic) that enables the wireless device 102 to communicate wirelessly, such as for wireless data and voice communication. The connectivity module 108, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth. The connectivity module 108 also includes antenna modules 112, a temperature manager module ("temperature manager") 114, and device connectivity data ("device data") 116.

The antenna modules 112 represent functionality (e.g., hardware and logic) for enabling the wireless device 102 to send and receive wireless signal, such as for wireless connectivity to the wireless networks 104. At least some individual antenna modules 112, for instance, each include a physical antenna device that is operable to receive wireless signal transmitted by the wireless networks 104, and to transmit wireless signal for receipt by the wireless networks 104. The antenna modules 112 may include other hardware and logic, for as for adapting operating parameters of physical antennas. In at least one implementation, at least some of the antenna modules 112 represent antennas without integrated logic, such as patch antennas and/or arrays of antennas that are communicatively connected to the connectivity module 108. Further, the wireless device 102 may employ instances of the antenna modules 112 physically arranged at different locations on the wireless device 102, such as to optimize wireless performance of the wireless device 102.

For instance, the environment 100 depicts an internal view 118 that represents a view of the wireless device 102 with a surface removed, such as a display screen of the wireless device 102. Depicted in the internal view 118 is an antenna module 112a, antenna module 112b, antenna module 112c, and antenna module 112d, which represent different instances of the antenna modules 112. As shown, the antenna modules 112a-112d are each positioned at different physical locations on the wireless device 102. Further, the antenna modules 112a-112d are interconnected to provide an integrated antenna structure for enabling the wireless device to send and receive wireless signal. This particular arrangement of antenna modules 112 is presented for purpose of example only, and it is to be appreciated that the described implementations can utilize a variety of different arrangements of antennas not expressly described herein.

The internal view 118 also depicts components 120 of the wireless device 102, which represent various components of the wireless device 102 other than the antenna modules 112. Examples of the components 120 include a display, a battery, a power amplifier, a processing system, a power amplifier, RF circuitry, audio components, camera components, and so forth. Generally, operation of the components 120 may generate heat, which may contribute to heat accumulated at the antenna modules 112. As discussed herein, for instance, an instance of the antenna modules 112 (and/or multiple instances) may experience a thermal condition indicating that the antenna module 112 exceeds a threshold temperature and/or is in a default thermal mitigation mode. The thermal condition may be caused by heat generated by the antenna module itself, and/or heat generated by the components 120. For example, components 120 that are adjacent an antenna module 112 may generate heat that is transferred to the antenna module 112, causing the antenna module 112 to accumulate heat and experience a thermal condition.

The temperature manager 114 represents functionality for controlling operation of the antenna modules 112 based on various thermal conditions, such as temperatures that exceed a temperature threshold. For instance, the sensor system 110 includes sensors 122, including temperature sensors 124. Generally, the temperature sensors 124 represent sensors that detect thermal conditions at various regions of the wireless device 102, such as the components 120, and particularly pertaining to locations of the antenna modules 112. Thus, the temperature sensors 124 can be leveraged to measure thermal conditions at (e.g., in contact with and/or in proximity to) the individual antenna modules 112, and cause sensor data 126 describing the thermal conditions to be available to the temperature manager 114 for use in configuring operation of the antenna modules 112. The temperature sensors 124 may also be configured (e.g., positioned) to detect temperature state at various internal components 120, such as for use in predicting temperature conditions and trends that may result in instances of the antenna modules 112 experiencing a thermal condition.

Generally, in addition to detecting temperature-related conditions, the sensor system 110 is representative of functionality to detect various physical and/or logical phenomena in relation to the wireless device 102, such as motion, light, image detection and recognition, time and date, position, location, touch detection, and so forth. To enable the sensor system 110 to detect such phenomena, the sensor system 110 leverages the sensors 122 to generate the sensor data 126. Examples of the sensors 122 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 126 represents raw sensor data collected by the sensors 122. Alternatively or in addition, the sensor data 126 represents raw sensor data from the sensors 122 that is processed to generate processed sensor data, such as sensor data from multiple sensors 122 that is combined to provide more complex representations of wireless device 102 state than can be provided by a single sensor 122.

The wireless device 102 generates and/or maintains the device data 116, which is representative of various types of data that is used and/or observed by the connectivity module 108. The device data 116, for instance, includes thermal operating parameters for the antenna modules 112, such as temperature thresholds, historical observed thermal conditions, current (e.g., real time) thermal conditions, and so forth. The device data 116 also includes other types of data, such as signal data 128 that describes attributes of wireless signal received and/or detected by the connectivity module 108, e.g., base station identifiers, received signal strength indicator (RSSI), signal strength (e.g., in dBm), signal frequency band, signal quality (e.g., signal-to-noise (S/N) ratio), and so forth.

In at least one implementation, the connectivity module 108 wirelessly connects the wireless device 102 to the wireless networks 104 via interaction between the connectivity module 108 and network connectivity devices 130. Generally, the network connectivity devices 130 are representative of functionality to receive and transmit wireless signal and serve as access portals for the wireless networks 104. Examples of the network connectivity devices 130 include a wireless cellular base station (e.g., a gNB of a 5G wireless network), a wireless access point (e.g., for a WLAN and/or a Wireless Wide Area Network (WWAN)), a short-range wireless network access point, and so forth. In at least one implementation, the network connectivity device 130 and/or the wireless networks represent wireless signal sources for the wireless device 102.

The environment 100 further includes a connectivity service 132 which is connected to and accessible via the wireless networks 104. The wireless device 102, for instance, can interact with the connectivity service 132 to obtain various connectivity-related information and services. For example, the connectivity service 132 includes service wireless data ("service data") 134, which represents various wireless connectivity-related data obtained by the connectivity service 132 in different ways. The service data 134, for instance, can include overlapping and/or identical information to the device data 116. Further details concerning how the service data 134 is obtained and utilized are discussed below.

Figure 2:
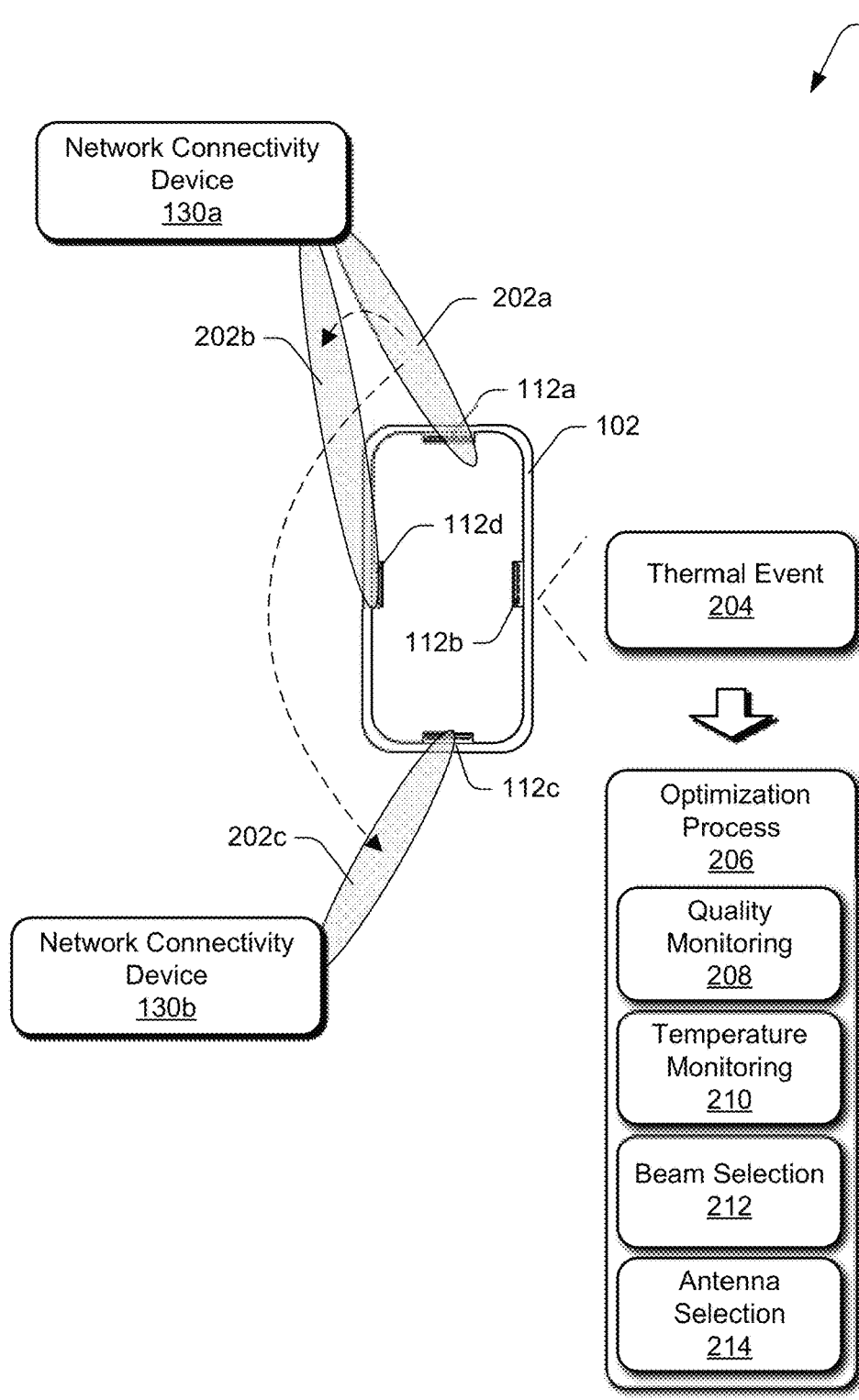
FIG. 2 depicts a scenario for wireless optimization for a wireless device based on a thermal condition in accordance with one or more implementations.
Figure 3:
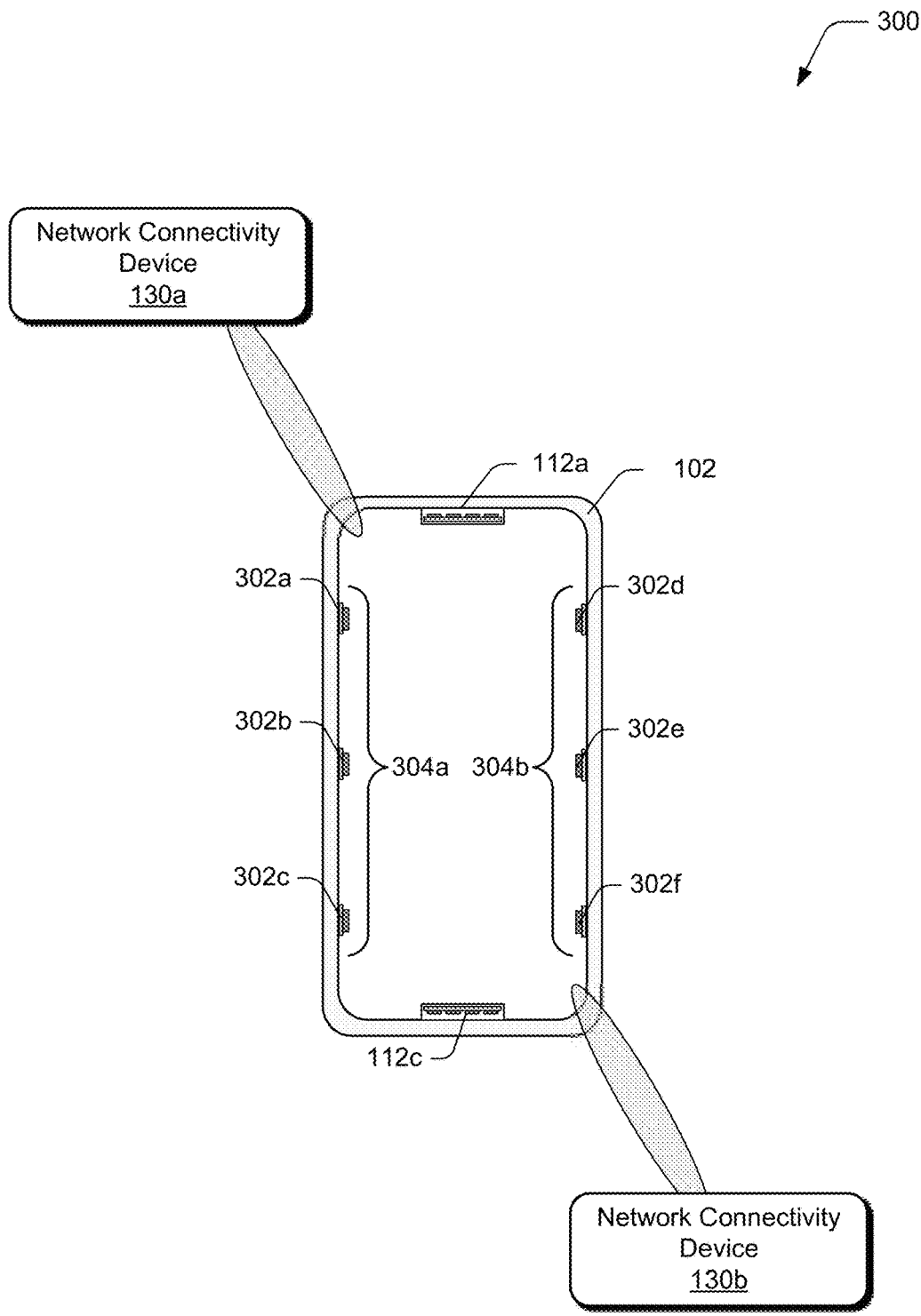
FIG. 3 depicts a scenario for wireless optimization utilizing an antenna configuration that includes individual antenna elements in accordance with one or more implementations.

FIGS. 2 and 3 depict different aspects of implementations for thermal based wireless configuration. For instance, FIG. 2 depicts a scenario 200 for wireless optimization for a wireless device based on a thermal condition. In the scenario 200, the antenna module 112*a* exchanges (e.g., receives and/or transmits) wireless signal with a network connectivity device 130*a* via a wireless beam 202*a*. Generally, the wireless beam 202*a* represents a directional wireless signal that is established between the network connectivity device 130*a* and the wireless device 102 via a beamforming process. In at least one implementation, the wireless beam 202*a* represents a primary wireless beam that is leveraged to handle primary wireless communication for the wireless device 102.

Further to the scenario 200, a thermal event 204 is detected indicating a thermal condition at the antenna module 112*a* of the wireless device 102. The temperature manager 114, for instance, receives thermal data from the temperature sensor 124 indicating that a thermal condition occurs at the antenna module 112*a*. The thermal event 204, for instance, indicates that a temperature detected at the antenna module 112*a* exceeds a threshold temperature, and/or that a thermal mitigation process is initiated to attempt to reduce a temperature of the antenna module 112*a*. Alternatively or additionally, the thermal event 204 may indicate that a temperature state (e.g., temperature trend) at a component 120 adjacent the antenna module 112*a* indicates that the antenna module 112*a* is predicted to experience a thermal condition with a proceeding specific period of time, e.g., n seconds. Generally, a thermal mitigation process represents a default system process for reducing heat accumulated at the antenna module 112*a*. For example, thermal mitigation can include patch reduction at the antenna module 112*a*, such as reducing a number of active antenna patches (e.g., antenna elements) at the antenna module 112*a*. In a reduced patch mode, for instance, some patches of a patch array antenna can be deactivated to mitigate thermal output of the antenna while still maintaining some wireless functionality of the antenna.

Based on the thermal event 204, the connectivity module 108 initiates an optimization process 206 for optimizing wireless performance of the wireless device 102. As part of the optimization process 206, the connectivity module 108 performs quality monitoring 208 and temperature monitoring 210. Generally, the quality monitoring 208 determines wireless signal conditions at the individual antenna modules 112, such as signal strength and/or signal quality. Further, the temperature monitoring 210 determines thermal conditions (e.g., temperature) at the individual antenna modules 112 and/or components 120. Accordingly, based on the quality monitoring 208 and/or the temperature monitoring 210, the connectivity module 108 performs beam selection 212 and/or antenna selection 214.

For instance, the quality monitoring 208 monitors wireless condition across different wireless beams received at the wireless device 102, such as signal quality and/or signal strength of wireless signal received via wireless beams at each antenna module 112. The connectivity module 108, for example, identifies different wireless beams received at the wireless device 102, and whether any received wireless beams meet a signal condition threshold, e.g., a threshold signal strength and/or signal quality. In this particular example, the quality monitoring 208 identifies a wireless beam 202*b* that is received at the antenna module 112*d* and that is available for providing wireless connectivity for the wireless device 102. For example, the connectivity module 108 determines that the wireless beam 202*b* meets a signal condition threshold.

Further, as part of the temperature monitoring 210, the connectivity module 108 determines that the antenna module 112*d* does not exhibit a thermal condition, e.g., does not have a temperature that meets a temperature threshold and is not subject to a thermal mitigation process. Accordingly, the connectivity module 108 designates the wireless beam 202*b* as a primary wireless beam of the wireless device 102. The connectivity module 108, for instance, switches from the wireless beam 202a as a primary wireless beam to the wireless beam 202b as a primary wireless beam of the wireless device 102. In at least one implementation, the connectivity module 108 can switch off (e.g., force disable) the antenna module 112a to allow a temperature of the antenna module 112a to reduce.

In at least one implementation, as part of the quality monitoring 208 the connectivity module 108 ascertains a wireless signal condition of multiple wireless beams across each of the antenna modules 112b-112d, and selects the wireless beam 202b based on the wireless beam 202b exhibiting a best signal condition among the antenna modules 112b-112d.

Additionally or alternatively to searching across available wireless beams, the quality monitoring 208 monitors wireless condition at the individual antenna modules 112, such as signal quality and/or signal strength of wireless signal received via wireless beams at each antenna module 112. The connectivity module 108, for instance, determines whether each antenna module 112 is receiving wireless signal, and whether any received wireless signal meets a signal condition threshold, e.g., a threshold signal strength and/or signal quality. In this particular example, the quality monitoring 208 identifies a wireless beam 202b that is received at the antenna module 112d and that is available for providing wireless connectivity for the wireless device 102. For example, the connectivity module 108 determines that the wireless beam 202b meets a signal condition threshold, and that the antenna module 112d does not exhibit a thermal condition such as a temperature in excess of a temperature threshold. Accordingly, the connectivity module 108 designates the antenna module 112d as a primary active antenna of the wireless device 102, and the wireless beam 202b as a primary wireless beam. The connectivity module 108 may also switch off (e.g., force disable) the antenna module 112a to allow a temperature of the antenna module 112a to return to a normal operating temperature.

Additionally or alternatively to receiving different wireless beams from a particular instance of the network connectivity device 130a, beams may be received from multiple different network connectivity devices 130 and thus may be available for beam/antenna switching. For instance, a wireless beam 202c may be received at the antenna module 112c from a network connectivity device 130b, and thus may be available for designation as a primary wireless beam and/or primary antenna. Consider, for example, that as part of the quality monitoring 208, the connectivity module 108 identifies the wireless beam 202c as meeting a threshold wireless condition and determines that the antenna module 112c is within an acceptable thermal condition. Accordingly, the connectivity module 108 can designate the wireless beam 202c as a primary wireless beam (e.g., switch from the wireless beam 202a), and/or can designate the antenna module 112c as a primary antenna of the wireless device 102. Thus, the described techniques can enable wireless beams from multiple different network connectivity devices 130 to be considered for wireless connectivity when the thermal event 204 occurs, e.g., concurrently and/or simultaneously.

While the quality monitoring 208 and the temperature monitoring 210 are discussed above in the context of addressing the thermal event 204, these process may be performed independent of a thermal event indicating a need to obtain an alternative wireless beam. For instance, the quality monitoring 208 and/or the temperature monitoring 210 may be done outside of the optimization process 202, e.g., periodically and in real-time to enable the connectivity module 108 to maintain as part of the signal data 128 a real-time wireless state for the wireless device 102 and across each of the antenna modules 112. Thus, should the thermal event 204 occur, the connectivity module 108 can quickly respond to reassign a primary wireless beam and/or primary antenna module, thus reducing potential wireless performance impact on the wireless device 102.

FIG. 3 depicts a scenario 300 for wireless optimization utilizing an antenna configuration that includes individual antenna elements additionally or alternatively to the integrated antenna modules 112 described above. In this particular implementation, the wireless device 102 includes antennas 302a-302f, which represent different individual antenna elements that can be positioned on different regions of the wireless device 102. Further, instances of the antennas 302a-302f can be interconnected to provide an antenna array and/or subarray for providing wireless connectivity to the wireless device 102. In at least one implementation, the individual antennas 302a-302f and/or combinations of the antennas may include their own radio frequency front end (RFFE) circuitry that enables the antennas to operate individually and/or in combination to provide the wireless device 102 with wireless connectivity. At least some of the antennas 302, for instance, are not part of an integrated antenna module array, but represent individual antenna patches that can be interconnected to provide antenna functionality to the wireless device 102.

For instance, consider that the antennas 302a-302c are interconnected to represent an antenna array 304a, and the antennas 302d-302f are interconnected to represent an antenna array 304b. Generally, the antenna arrays 304 are individually activatable to activate/deactivate the individual antenna arrays, and the individual antennas 302 are individually switchable to configure the respective antennas arrays 304, such as by removing or adding individual antennas to reconfigure the antenna arrays 304. Thus, as part of the beam selection 212 and/or the antenna selection 214 described above, the connectivity module 108 can select individual antennas 302 and/or antenna arrays 304, and may add or remove antennas from the antenna arrays 304 to suit different wireless signal conditions. Further, individual instances of the antennas 302 may be utilized in combination with instances of the antenna modules 112 (e.g., in this case, the antenna modules 112a, 112c) to provide a wide variety of different antennas configurations. For instance, thermal state of the individual antennas 302 and/or antenna arrays 304 can be monitored, and if a particular antenna/antenna array experiences a thermal condition, techniques described herein can be employed to optimize antenna performance for the wireless device 102.

Additionally or alternatively to switching between different antennas by activating/deactivating antennas, implementations for thermal based wireless configuration may utilize antenna aggregation to optimize wireless performance. For instance, consider the implementations discussed in the scenario 200 above. As part of the beam selection 212 and/or the antenna selection 214, multiple antenna modules 112 can be activated and utilized for wireless connectivity. For instance, based on detecting the thermal event 202 pertaining to the antenna module 112a, the wireless beam 202a can be spread across the antenna modules 112a, 112d, such as by activating the antenna module 112d and maintaining the antenna module 112a in an active state. Alternatively or in addition, the antenna module 112a can be maintained in an active state for receiving the wireless beam 202a, and the antenna module 112d can be activated for simultaneously receiving the wireless beam 202b. Thus, wireless signal transmitted between the wireless device 102 and the network connectivity device 130a can be spread across the wireless beams 202a, 202b, such as by inverse multiplexing the wireless signal for simultaneous and/or concurrent transmission across the wireless beams 202a, 202b.

Further, with reference to the scenario 300, the individual antennas 302 and/or antenna arrays 304 can be aggregated in different ways, such as by spreading a single wireless beam across multiple antennas/antenna arrays, and/or by receiving multiple wireless beams simultaneously across multiple respective antennas/antenna arrays.

Figure 4:
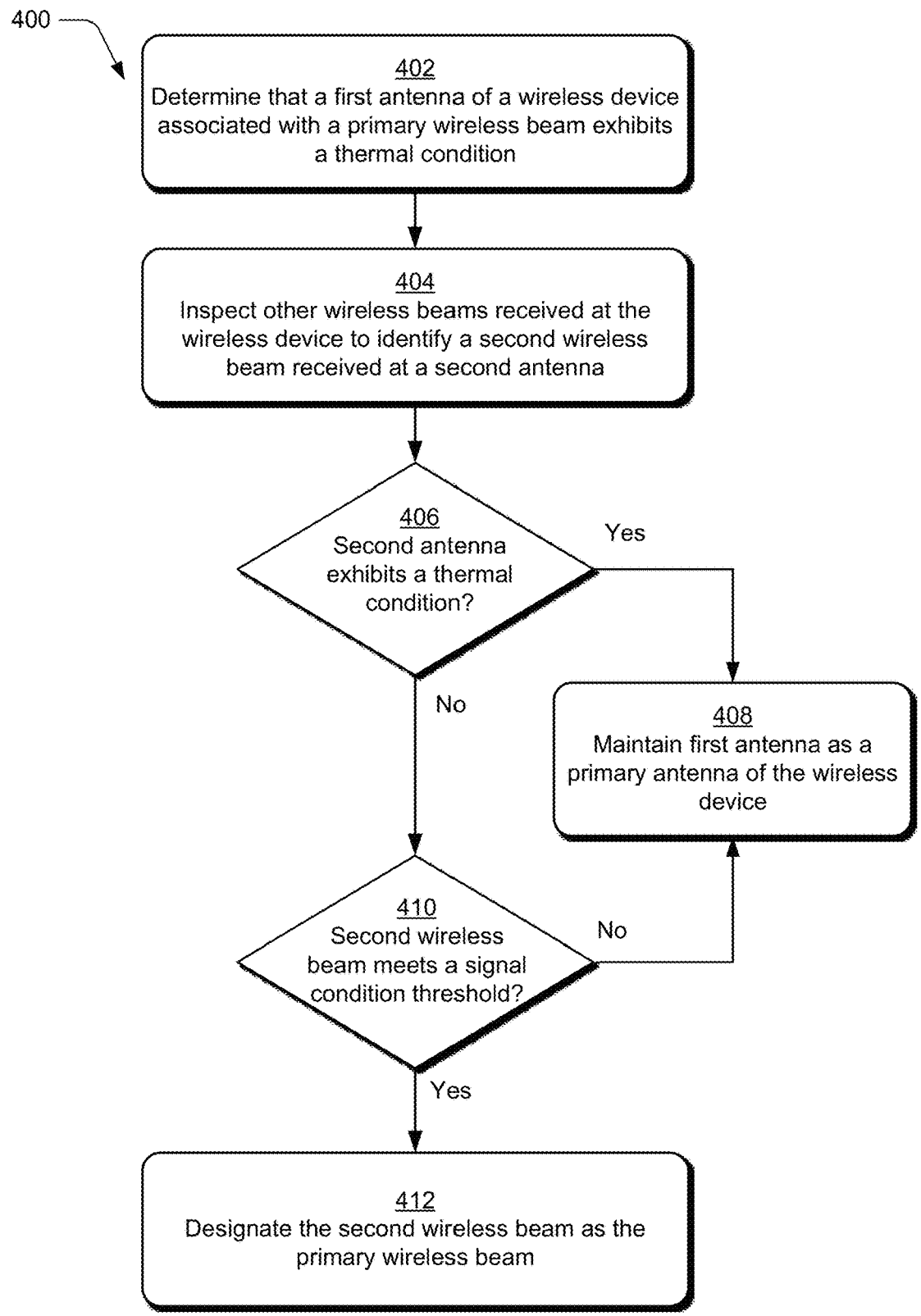
FIG. 4 depicts a method for calibrating wireless performance of a wireless device via beam switching in accordance with one or more implementations described herein.

FIG. 4 depicts a method 400 for calibrating wireless performance of a wireless device via beam switching. At 402, a determination is made that a first antenna of a wireless device associated with a primary wireless beam exhibits a thermal condition. The temperature manager 114, for instance, receives temperature data from the temperature sensor 124 indicating that a particular antenna receiving a primary wireless beam exhibits a thermal condition. Alternatively or in addition, the temperature manager 114 can receive an indication that the first antenna is in a default thermal mitigation mode. In yet a further implementation, the temperature manager 114 can determine that a component 120 of the wireless device 102 exhibits a temperature state (e.g., a temperature trend) that may cause an antenna module 112 to experience a thermal condition at a future point, e.g., within n seconds.

At 404, other wireless beams received at the wireless device are inspected to identify a second wireless beam received at a second antenna. The connectivity module 108, for instance, monitors other antennas of the wireless device 102 to identify a different antenna that receives a wireless beam. In implementations where multiple wireless beams (e.g., more than two beams) are received at the wireless device 102, the connectivity module 108 can cycle through the multiple wireless beams to select a particular wireless beam or set of wireless beams for further processing. At 406, it is determined whether the second antenna exhibits a thermal condition. For instance, the temperature manager 114 determines whether the second antenna exceeds a threshold temperature and/or is in a default thermal mitigation mode. If the second antenna exhibits a thermal condition ("Yes"), at 408 the first antenna is maintained as a primary antenna of the wireless device.

If the second antenna does not exhibit a thermal condition ("No"), at 410 it is determined whether the second wireless beam meets a signal condition threshold. The connectivity module 108, for instance, determines whether the second wireless beam meets a signal strength and/or signal quality threshold. If the second wireless beam does not meet the signal condition threshold (e.g., is below a threshold signal strength/quality) ("No"), the process proceeds to 408 where the first antenna is maintained as a primary antenna of the wireless device.

If the second wireless beam meets the signal condition threshold ("Yes"), at 410 the second wireless beam is designated as the primary wireless beam. In at least one implementation, the first antenna may be deactivated, or may be operated in a reduced patch and/or reduced power mode.

Figure 5:
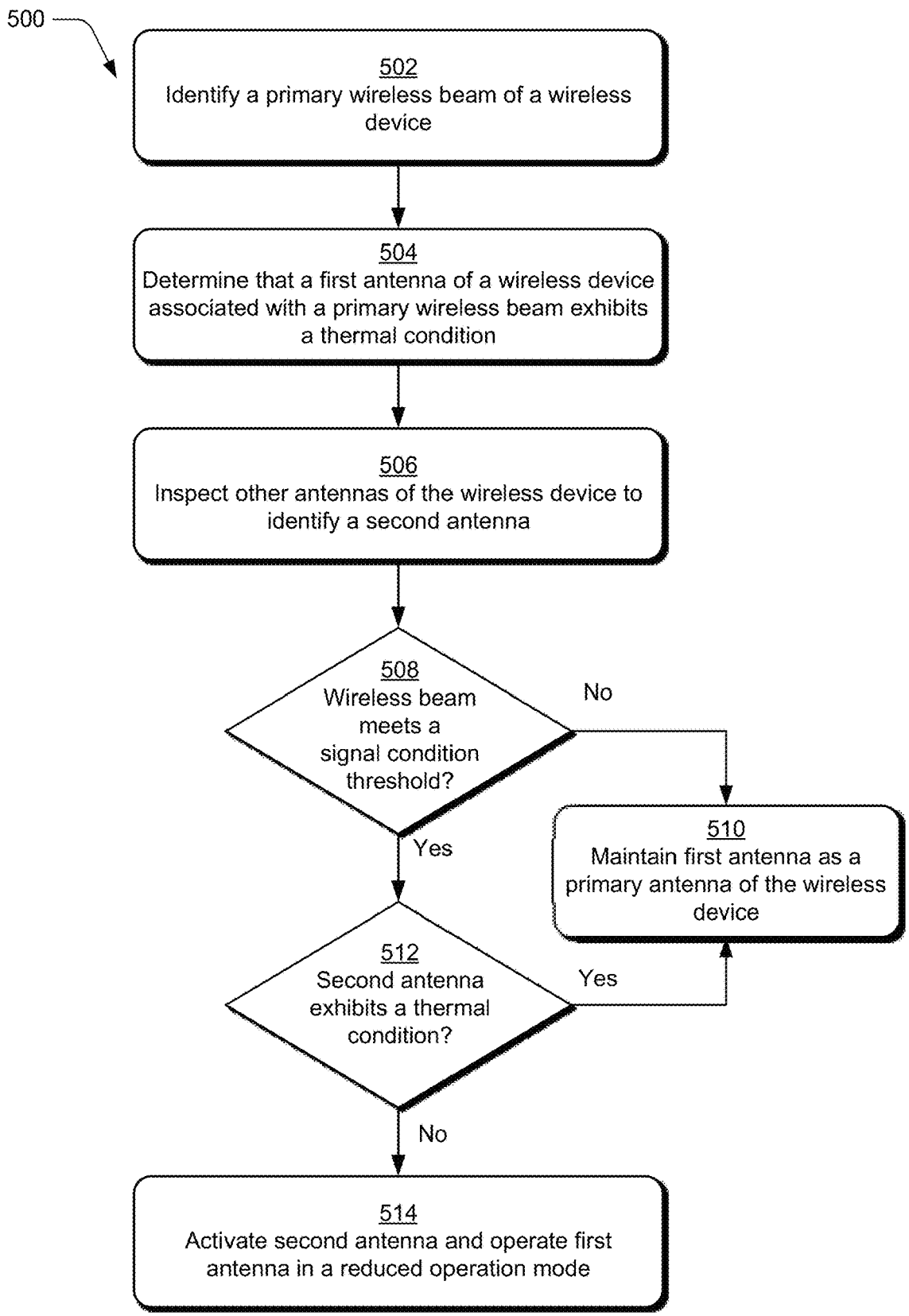
FIG. 5 depicts a method for calibrating wireless performance of a wireless device via antenna switching in accordance with one or more implementations described herein.

FIG. 5 depicts a method 500 for calibrating wireless performance of a wireless device via antenna switching. The method 500, represents an additional or alternative method to the method 400. At 502, a primary wireless beam of a wireless device is identified. The connectivity module 108, for instance, determines that a particular wireless beam received at the wireless device 102 is a primary wireless beam for wireless communication. At 504, it is determined that a first antenna of a wireless device associated with the primary wireless beam exhibits a thermal condition. For example, the temperature manager 114 determines that the first antenna exhibits a thermal condition such that an antenna optimization process is to be performed. Alternatively or additionally, the temperature manager 114 determines that a component 120 of the wireless device 102 exhibits a temperature state (e.g., temperature trend) that may cause the antenna to experience a thermal condition at a future point, e.g., within n seconds.

At 506, other antennas of the wireless device are inspected to identify a second antenna. The connectivity module 108, for instance, monitors other antennas of the wireless device 102 to identify a different antenna that receives a wireless beam. The wireless beam received at the different antenna, for instance, may be the same wireless beam received at the first antenna, or may be a different wireless beam. At 508, it is determined whether a wireless beam received at the second antenna meets a signal condition threshold. For example, the connectivity module 108 determines whether the wireless beam meets a threshold signal strength and/or signal quality. If the wireless beam does not meet the signal condition threshold ("No") at 510 the first antenna is maintained as a primary antenna of the wireless device. Further, the wireless beam at the first antenna can be maintained as a primary wireless beam of the wireless device.

If the wireless beam received at the second antenna meets the signal condition threshold ("Yes") at 512 it is ascertained whether the second antenna exhibits a thermal condition. If the second antenna exhibits a thermal condition ("Yes"), the process proceeds to 510 where the first antenna is maintained as a primary antenna of the wireless device.

If the second antenna does not exhibit a thermal condition ("No"), at 514 the second antenna is activated and the first antenna is operated in a reduced operation mode. Further, the wireless beam received at the second antenna can be designated as the primary wireless beam. The second antenna, for instance, is designated as an active (e.g., primary) antenna of the wireless device 102, and the wireless beam is designated as a primary wireless beam for wireless communication at the wireless device 102. In an implementation where the second antenna receives a different wireless beam than is received at the first antenna, this can include switching to a different primary wireless beam. Alternatively, the second antenna can utilize the same wireless beam initially utilized by the first antenna. In at least one implementation, as part of operating the first antenna in a reduced operation mode, the first antenna can be deactivated (e.g., force deactivated) or operated in a reduced patch and/or reduced power mode.

Figure 6:
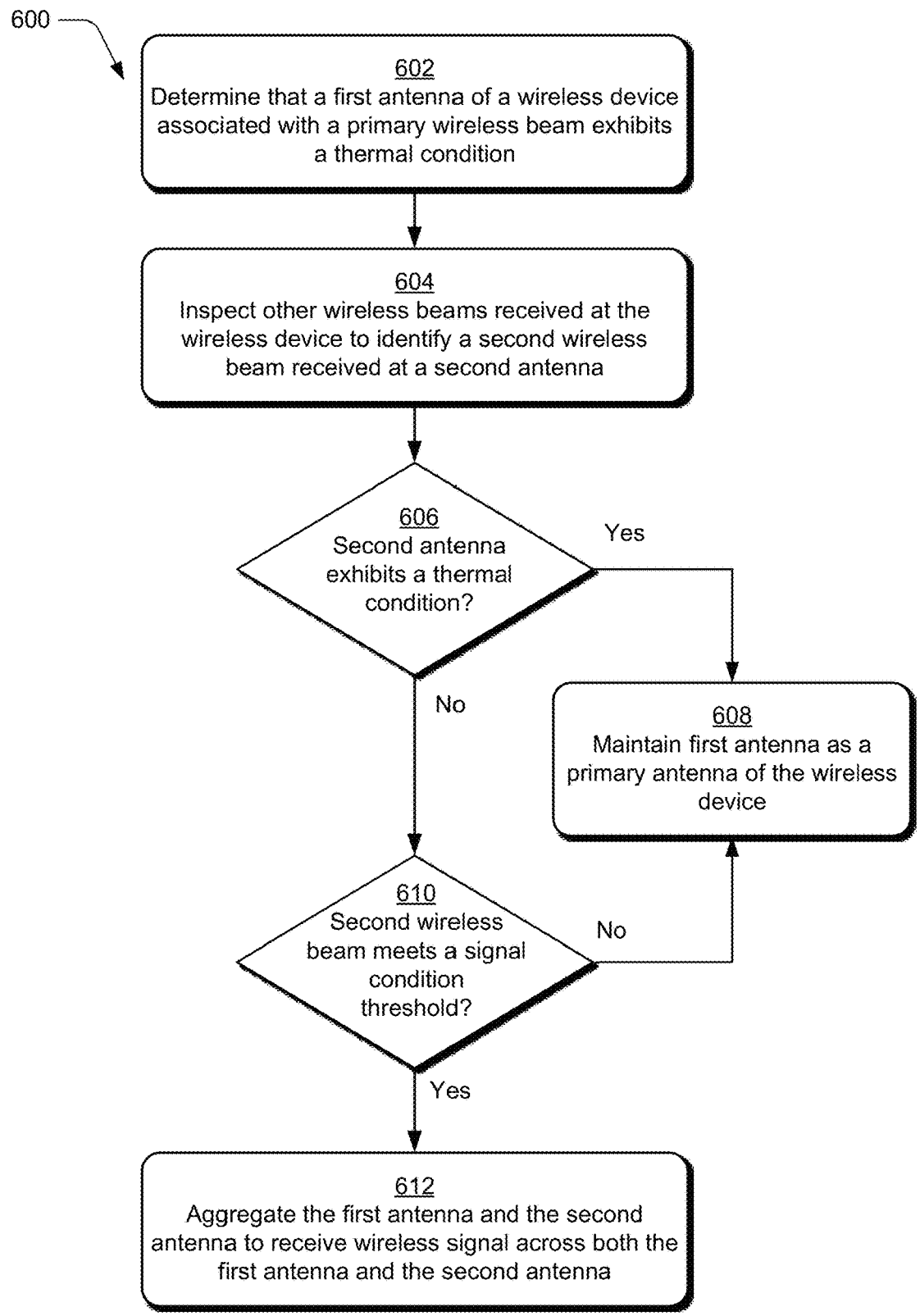
FIG. 6 depicts a method for calibrating wireless performance of a wireless device via antenna aggregation in accordance with one or more implementations described herein.

FIG. 6 depicts a method 600 for calibrating wireless performance of a wireless device via antenna aggregation. The method 600, represents an additional or alternative method to the methods 400, 500.

At 602, a determination is made that a first antenna of a wireless device associated with a primary wireless beam exhibits a thermal condition. The temperature manager 114, for instance, receives temperature data from the temperature sensor 124 indicating that a particular antenna receiving a primary wireless beam exhibits a thermal condition. Alternatively or in addition, the temperature manager 114 can receive an indication that the first antenna is in a default thermal mitigation mode. Alternatively or additionally, the temperature manager 114 determines that a component 120 of the wireless device 102 exhibits a temperature state (e.g., a temperature trend) that may cause the first antenna to experience a thermal condition at a future point, e.g., within n seconds.

At 604, other wireless beams received at the wireless device are inspected to identify a second wireless beam received at a second antenna. The connectivity module 108, for instance, monitors other antennas of the wireless device 102 to identify a different antenna that receives a wireless beam. At 606, it is determined whether the second antenna exhibits a thermal condition. For instance, the temperature manager 114 determines whether the second antenna exceeds a threshold temperature and/or is in a default thermal mitigation mode. If the second antenna exhibits a thermal condition ("Yes"), at 608 the first antenna is maintained as a primary antenna of the wireless device.

If the second antenna does not exhibit a thermal condition ("No"), at 610 it is determined whether the second wireless beam meets a signal condition threshold. The connectivity module 108, for instance, determines whether the second wireless beam meets a signal strength and/or signal quality threshold. If the second wireless beam does not meet the signal condition threshold (e.g., is below a threshold signal strength/quality) ("No"), the process proceeds to 608 where the first antenna is maintained as a primary antenna of the wireless device.

If the second wireless beam meets the signal condition threshold ("Yes"), at 612 the first antenna and the second antenna are aggregated to receive wireless signal across both the first antenna and the second antenna. Generally, the wireless signal may include the first wireless beam, the second wireless beam, and/or a combination of both. In at least one implementation, the first antenna may be operated in a reduced patch and/or reduced power mode but kept active to receive portions of a wireless beam.

By way of example, the first antenna and second antenna are aggregated by causing portions of a single wireless beam to be received at both the first antenna and the second antenna, e.g., different respective portions of the wireless beam at the first antenna and the second antenna. Alternatively or in addition, the first antenna and the second antenna can receive different wireless beams simultaneously. For instance, wireless data to be communicated between the wireless device 102 and a network connectivity device 130 can be spread across multiple wireless beams for simultaneous and/or concurrent transmission between the network connectivity device 130 and multiple antennas of the wireless device 102.

As an alternative or additional implementation, in a scenario where the first antenna exhibits a thermal condition, the second antenna can be aggregated with a further different antenna and the first antenna can be deactivated or operated in a reduced power mode.

Generally, the various implementations discussed above can be performed dynamically and in real-time to compensate for changes in temperature and/or signal condition that occur as part of wireless communication. For instance, in a scenario where a thermal condition occurs at a first antenna and thus a second antenna is selected to replace the first antenna, the second antenna may subsequently exhibit a thermal condition. Thus, the described techniques may be subsequently implemented to select a third antenna to replace and/or supplement the second antenna. Further, in antenna aggregation scenarios, antennas selected to be aggregated can be dynamically selected and can change in real-time to compensate for changes in antenna condition of individual antennas, e.g., thermal condition and/or signal condition. Thus, the described techniques enable adjustment of antenna configurations to occur dynamically in response to various events, thus enabling wireless performance of a wireless device to be optimized in real-time.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
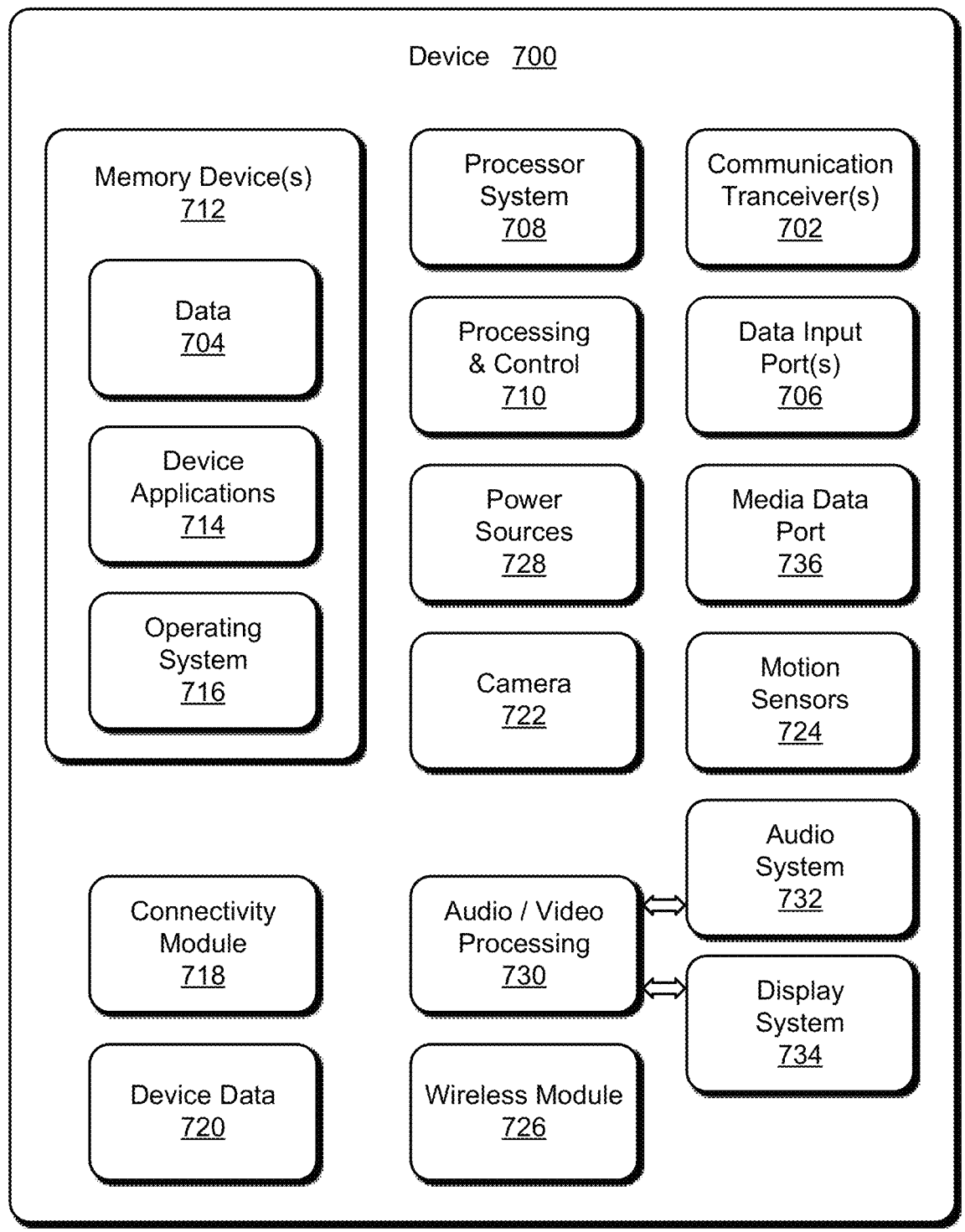
FIG. 7 illustrates various components of an example device that can implement aspects of thermal based wireless configuration.

FIG. 7 illustrates various components of an example device 700 in which aspects of thermal based wireless configuration can be implemented. The example device 700 can be implemented as any of the devices described with reference to the previous FIGS. 1-6, such as any type of wireless device, mobile phone, mobile device, wearable device, tablet, computing, communication, entertainment, gaming, media playback, and/or other type of electronic device. For example, the wireless device 102 as shown and described with reference to FIGS. 1-6 may be implemented as the example device 700. In a wearable device implementation, the device may include any one or combination of a watch, armband, wristband, bracelet, glove or pair of gloves, glasses, jewelry items, clothing items, any type of footwear or headwear, and/or other types of wearables.

The device 700 includes various components, which represent examples of the components 120 discussed above. The device 700, for instance, includes communication transceivers 702 that enable wired and/or wireless communication of data 704 with other devices. The data 704 can include any of device identifying data, device location data, wireless connectivity data, and wireless protocol data. Additionally, the data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processor system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes a connectivity module 718 that implements aspects of thermal based wireless configuration, and may be implemented with hardware components and/or in software as one of the device applications 714, such as when the device 700 is implemented as the wireless device 102. An example, the connectivity module 718 can be implemented as the connectivity module 108 described in detail above. In implementations, the connectivity module 718 may include independent processing, memory, and logic components as a computing and/or electronic device integrated with the device 700. The device 700 also includes device data 720 for implementing aspects of thermal based wireless configuration, and may include data from the connectivity module 108.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device. The various motion sensors 724 may also be implemented as components of an inertial measurement unit in the device.

The device 700 also includes a wireless module 726, which is representative of functionality to perform various wireless communication tasks. For instance, for the wireless device 102, the wireless module 726 can be leveraged to scan for and detect wireless networks, as well as negotiate wireless connectivity to wireless networks for the wireless device 102. The device 700 can also include one or more power sources 728, such as when the device is implemented as a wireless device. The power sources 728 may include a charging and/or power system, and can be implemented as a flexible strip battery, a rechargeable battery, a charged super-capacitor, and/or any other type of active or passive power source. Generally, utilizing implementations of thermal based wireless configuration enables the power sources 728 to be conserved as part of a wireless network connectivity process.

The device 700 also includes an audio and/or video processing system 1430 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Although implementations of thermal based wireless configuration have been described in language specific to features and/or methods, the subject of the appended claims is not necessarily limited to the specific features or methods described. Rather, the features and methods are disclosed as example implementations of thermal based wireless configuration, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: determining that a first antenna of a wireless device associated with a primary wireless beam exhibits a thermal condition; inspecting one or more other wireless beams received at the wireless device to identify a second wireless beam that meets a signal condition threshold; ascertaining whether a second antenna associated with the second wireless beam exhibits the thermal condition; and designating the second wireless beam as the primary wireless beam based on the second antenna not exhibiting the thermal condition.

Alternatively or in addition to the above described method, any one or combination of: wherein the thermal condition is based on one or more of the first antenna exceeding a threshold temperature, the first antenna being in a default thermal mitigation mode of the wireless device, or a temperature state of a different component of the wireless device; wherein the signal condition threshold is based on one or more of a threshold signal strength or a threshold signal quality; further comprising deactivating the first antenna based on said designating the second wireless beam as the primary wireless beam; further comprising operating the first antenna in one or more of a reduced power mode or a reduced patch mode based on said designating the second wireless beam as the primary wireless beam; further comprising aggregating the first antenna with the second antenna by receiving the second wireless beam across both the first antenna and the second antenna; wherein the second antenna comprises an antenna array made up of multiple different individual antenna elements within the wireless device.

A method comprising: identifying a primary wireless beam of a wireless device; determining that a first antenna of the wireless device associated with the primary wireless beam exhibits a thermal condition; inspecting one or more other antennas of the wireless device to identify a second antenna that meets a signal condition threshold; ascertaining whether the second antenna exhibits the thermal condition; and activating the second antenna based on the second antenna not exhibiting the thermal condition, and causing the first antenna to operate in a reduced operation mode.

Alternatively or in addition to the above described method, any one or combination of: wherein said determining that a first antenna of the wireless device associated with the primary wireless beam exhibits a thermal condition is based on one or more of a notification indicating that the first antenna exceeds a threshold temperature, a notification that the first antenna is in a default thermal mitigation mode, or a notification of a temperature state of a different component of the wireless device; wherein said inspecting one or more other antennas of the wireless device to identify a second antenna that meets a signal condition threshold comprises inspecting signal condition at multiple different antennas of the wireless device; the signal condition threshold comprises one or more of a threshold signal strength or a threshold signal quality, the method further comprising selecting the second antenna based on the second antenna exhibiting one or more of a highest signal strength or a highest signal quality among the multiple different antennas; wherein said causing the first antenna to operate in a reduced operation mode comprises force disabling the first antenna; wherein said causing the first antenna to operate in a reduced operation mode comprises operating the first antenna in a reduced patch mode by deactivating at least some patches of the first antenna; further comprising aggregating the first antenna and the second antenna such that the primary wireless beam is received across both the first antenna and the second antenna; wherein the second antenna comprises an array of multiple antenna elements positioned at different regions of the wireless device.

A wireless device comprising: a set of antennas; and a connectivity module implemented to: determine that a first antenna of the wireless device associated with a primary wireless beam exhibits a thermal condition; inspect one or more other wireless beams received at the wireless device to identify a second antenna associated with a second wireless beam that meets a signal condition threshold; and aggregate the first antenna and the second antenna to receive wireless signal across both the first antenna and the second antenna.

Alternatively or in addition to the above described device, any one or combination of: wherein the second antenna comprises one or more individual antenna elements positioned within the wireless device; wherein the one or more individual antenna elements comprise an antenna subarray of multiple antenna elements positioned at different regions of the wireless device; wherein the connectivity module is implemented to aggregate the first antenna and the second antenna to cause the second wireless beam to be received at both the first antenna and the second antenna; wherein the connectivity module implemented to aggregate the first antenna and the second antenna to cause the first wireless beam to be received at the first antenna and the second wireless beam to be received at the second antenna.

The invention claimed is:
1. A method, comprising:
determining that a first antenna of a wireless device associated with a primary wireless beam exhibits a thermal condition;
inspecting one or more other wireless beams received at the wireless device to identify a second wireless beam that meets a signal condition threshold;
ascertaining whether a second antenna associated with the second wireless beam exhibits the thermal condition;
designating the second wireless beam as the primary wireless beam based on the second antenna not exhibiting the thermal condition; and
operating the first antenna in one or more of a reduced power mode or a reduced patch mode based on said designating the second wireless beam as the primary wireless beam.

2. The method as recited in claim 1, wherein the thermal condition is based on one or more of the first antenna exceeding a threshold temperature, the first antenna being in a default thermal mitigation mode of the wireless device, or a temperature state of a different component of the wireless device associated with the first antenna.

3. The method as recited in claim 1, wherein the signal condition threshold is based on one or more of a threshold signal strength or a threshold signal quality.

4. The method as recited in claim 1, further comprising aggregating the first antenna with the second antenna by receiving the second wireless beam across both the first antenna and the second antenna.

5. The method as recited in claim 1, wherein the second antenna comprises an antenna array made up of multiple different individual antenna elements within the wireless device.

6. A method comprising:
identifying a primary wireless beam of a wireless device;
determining that a first antenna of the wireless device associated with the primary wireless beam exhibits a thermal condition;
inspecting one or more other antennas of the wireless device to identify a second antenna that meets a signal condition threshold;
ascertaining whether the second antenna exhibits the thermal condition;
activating the second antenna based on the second antenna not exhibiting the thermal condition, and causing the first antenna to operate in a reduced operation mode; and aggregating the first antenna and the second antenna such that the primary wireless beam is received across both the first antenna and the second antenna.

7. The method as recited in claim 6, wherein said determining that a first antenna of the wireless device associated with the primary wireless beam exhibits a thermal condition is based on one or more of a notification indicating that the first antenna exceeds a threshold temperature, a notification that the first antenna is in a default thermal mitigation mode, or a notification of a temperature state of a different component of the wireless device associated with the first antenna.

8. The method as recited in claim 6, wherein said inspecting one or more other antennas of the wireless device to identify a second antenna that meets a signal condition threshold comprises inspecting signal condition at multiple different antennas of the wireless device.

9. The method as recited in claim 8, wherein the signal condition threshold comprises one or more of a threshold signal strength or a threshold signal quality, the method further comprising selecting the second antenna based on the second antenna exhibiting one or more of a highest signal strength or a highest signal quality among the multiple different antennas.

10. The method as recited in claim 6, wherein said causing the first antenna to operate in a reduced operation mode comprises operating the first antenna in a reduced patch mode by deactivating at least some patches of the first antenna.

11. The method as recited in claim 6, wherein the second antenna comprises an array of multiple antenna elements positioned at different regions of the wireless device.

12. A wireless device comprising:
a set of antennas; and
a connectivity module implemented to:
    determine that a first antenna of the wireless device associated with a primary wireless beam exhibits a thermal condition;
    inspect one or more other wireless beams received at the wireless device to identify a second antenna associated with a second wireless beam that meets a signal condition threshold; and
    aggregate the first antenna and the second antenna to receive wireless signal across both the first antenna and the second antenna.

13. The wireless device as recited in claim 12, wherein the second antenna comprises one or more individual antenna elements positioned within the wireless device.

14. The wireless device as recited in claim 13, wherein the one or more individual antenna elements comprise an antenna subarray of multiple antenna elements positioned at different regions of the wireless device.

15. The wireless device as recited in claim 12, wherein the connectivity module is implemented to aggregate the first antenna and the second antenna to cause the second wireless beam to be received at both the first antenna and the second antenna.

16. The wireless device as recited in claim 12, wherein the connectivity module implemented to aggregate the first antenna and the second antenna to cause the primary wireless beam to be received at the first antenna and the second wireless beam to be received at the second antenna.

17. The wireless device as recited in claim 12, wherein to determine that the first antenna exhibits a thermal condition includes to determine that the first antenna is in a default thermal mitigation mode of the wireless device, or based on a temperature state of a different component of the wireless device associated with the first antenna.

18. The wireless device as recited in claim 12, wherein the signal condition threshold is based on one or more of a threshold signal strength or a threshold signal quality.

19. The wireless device as recited in claim 12, wherein the connectivity module implemented to operate the first antenna in a reduced power mode.

20. The wireless device as recited in claim 12, wherein the connectivity module implemented to operate the first antenna in a reduced operation mode including to operate the first antenna in a reduced patch mode by deactivating at least some patches of the first antenna.

* * * * *